(12) United States Patent
Lee et al.

(10) Patent No.: US 11,414,044 B2
(45) Date of Patent: Aug. 16, 2022

(54) INTEGRATED CONTROL APPARATUS AND METHOD FOR ACTIVE AND PASSIVE SAFETY APPARATUSES

(71) Applicant: HYUNDAI MOBIS CO., LTD., Seoul (KR)

(72) Inventors: Cheol Woo Lee, Yongin-si (KR); Tae Ho Roh, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 91 days.

(21) Appl. No.: 17/024,471

(22) Filed: Sep. 17, 2020

(65) Prior Publication Data

US 2021/0086720 A1   Mar. 25, 2021

(30) Foreign Application Priority Data

Sep. 20, 2019   (KR) .................. 10-2019-0115926

(51) Int. Cl.
| | | |
|---|---|---|
| B60R 22/02 | (2006.01) | |
| G01S 13/86 | (2006.01) | |
| B60R 22/48 | (2006.01) | |
| G01S 13/88 | (2006.01) | |
| B60R 21/01 | (2006.01) | |

(52) U.S. Cl.
CPC .............. *B60R 22/02* (2013.01); *B60R 21/01* (2013.01); *B60R 22/48* (2013.01); *G01S 13/86* (2013.01); *G01S 13/88* (2013.01)

(58) Field of Classification Search
CPC ......... B60R 22/02; B60R 22/01; B60R 22/48; B60R 21/01; G01S 13/86; G01S 13/88
See application file for complete search history.

(56) References Cited

U.S. PATENT DOCUMENTS

| | | | | |
|---|---|---|---|---|
| 5,540,461 A * | 7/1996 | Nitschke | ............. | B60R 21/0132 280/806 |
| 6,142,524 A * | 11/2000 | Brown | .............. | B60R 21/01546 297/480 |
| 9,517,767 B1 * | 12/2016 | Kentley | .................. | B60R 21/01 |
| 10,315,600 B2 * | 6/2019 | Garcia Gomez | ... | B60R 21/0136 |
| 2004/0075252 A1 * | 4/2004 | Pan | ........................ | B60R 21/207 280/730.1 |
| 2014/0336879 A1 * | 11/2014 | Kwon | ...................... | B60R 22/34 701/45 |
| 2016/0229375 A1 * | 8/2016 | Jabusch | .............. | B60R 22/4671 |
| 2019/0176736 A1 * | 6/2019 | Jang | .................. | B60R 21/01546 |

* cited by examiner

*Primary Examiner* — Tan Q Nguyen
(74) *Attorney, Agent, or Firm* — DLA Piper LLP (US)

(57) ABSTRACT

Disclosed is an integrated control apparatus for active and passive safety apparatuses, which includes a sensor unit comprising a plurality of sensors for detecting a driving state of a vehicle and a controller configured to process information detected through the sensor unit, determine a driving state of the vehicle based on the processed information, compare the processed information with a preset pre-safe seat belt (PSB) threshold value, and operate a PSB for each vehicle driving state based on a result of the comparison.

15 Claims, 6 Drawing Sheets

INTEGRATED CONTROL APPARATUS AND METHOD FOR ACTIVE AND PASSIVE SAFETY APPARATUSES

CROSS-REFERENCE TO RELATED APPLICATION

This application claims priority from and the benefit of Korean Patent Application No. 10-2019-0115926, filed on Sep. 20, 2019, which is hereby incorporated by reference for all purposes as if set forth herein.

BACKGROUND

Field

Exemplary embodiments of the present disclosure relate to an integrated control apparatus and method for active and passive safety apparatuses, and more particularly, to an integrated control apparatus and method for active and passive safety apparatuses, which can improve safety by minimizing a behavior of an occupant through control of the binding force of a safety belt, before a collision occurs in a vehicle, at an early stage in which the overturning of a vehicle occurs, and in a situation in which a vehicle travels on a rough road.

Discussion of the Background

As the vehicle safety technology advances, a vehicle is increasingly equipped with, in addition to the existing passive safety apparatus, such as a safety belt or an airbag for reducing damage to an occupant right after a collision accident, an active safety apparatus, such as front collision avoidance (FCA) for avoiding a collision or reducing a collision speed by previously predicting the collision before a collision accident occurs.

However, in a vehicle on which both the passive safety apparatus and the active safety apparatus are mounted, that is, in operations of the active and passive safety apparatuses mounted on the vehicle, optimization control performance for the active and passive safety apparatuses is low in a plurality of dangerous situations which may occur in the vehicle. Accordingly, there is a problem in that the safety of an occupant is not improved because a behavior of the occupant is not minimized.

For example, the existing pre-safe seat belt (PSB) system has a problem in that it does not improve the safety of an occupant because it may not control the binding force of a safety belt and thus may not minimize a behavior of the occupant in various situations, such as a situation before a collision occurs in a vehicle, an initial situation in which the overturning of a vehicle is in progress, and a situation in which a vehicle travels on a rough road.

SUMMARY

Various embodiments are directed to the provision of an integrated control apparatus and method for active and passive safety apparatuses, which can improve safety by minimizing a behavior of an occupant through control of the binding force of a safety belt, before a collision occurs in a vehicle, at an early stage in which the overturning of a vehicle occurs, and in a situation in which a vehicle travels on a rough road.

In an embodiment, an integrated control apparatus for active and passive safety apparatuses includes a sensor unit comprising a plurality of sensors for detecting a driving state of a vehicle and a controller configured to process information detected through the sensor unit, determine a driving state of the vehicle based on the processed information, compare the processed information with a preset pre-safe seat belt (PSB) threshold value, and operate a PSB for each vehicle driving state based on a result of the comparison.

In an embodiment, the sensor unit may include at least one of a radar sensor, a lidar sensor, a camera sensor, a remote impact sensor (RIS), an acceleration sensor, an angular velocity sensor, a speed sensor, a gravity sensor, and a gyro sensor.

In an embodiment, the PSB threshold value may be separately set for each vehicle driving state.

In an embodiment, the integrated control apparatus may further include a PSB driving unit configured to control a binding force and binding time of a safety belt through control of a driving current of a motor under the control of the controller.

In an embodiment, the controller may control a posture of an occupant before or after an occurrence of a collision accident by previously detecting the occurrence of the collision accident, may control a posture of the occupant before or after an overturning accident of the vehicle by detecting a situation in which the vehicle overturns, and may control a posture of the occupant when the vehicle travels on a rough road, based the control of the binding force and binding time of the safety belt through the PSB driving unit.

In an embodiment, the controller may control the PSB driving unit based on a preset PSB operation section. The PSB operation section may be set as a wider margin than an airbag deployment-possible section. The PSB operation section may be set as a time to collision (TTC) longer than a designated TTC of the airbag deployment-possible section and may be set as a closing velocity (CV) smaller than a designated CV of the airbag deployment-possible section.

In an embodiment, the controller may set the PSB operation section ahead of the airbag deployment-possible section, and may early bind an occupant through a PSB operation based on a pre-designated PSB operation profile before an airbag is deployed.

In an embodiment, the PSB operation profile may be set to control the binding force of the safety belt by increasing or decreasing the binding force of the safety belt based on the amount of a current for driving a motor for each vehicle driving state and by controlling the amount of the current for driving the motor over time.

In an embodiment, the controller may receive information for predicting the driving state or risk of an accident of the vehicle through the sensor unit, may determine the driving state of the vehicle by machining or processing the received information, may check whether the driving state of the vehicle enters the preset PSB operation section for each driving state of the vehicle by comparing the processed information with the PSB threshold value preset for each driving state of the vehicle, and may perform the PSB operation preset for each vehicle driving state through the PSB driving unit when the driving state of the vehicle enters the preset PSB operation section for each driving state of the vehicle, based on a result of the check.

In an embodiment, an integrated control method for active and passive safety apparatuses includes detecting, by a sensor unit, information for determining a driving state of a vehicle, machining or processing, by a controller, the information detected by the sensor unit, determining, by the controller, a driving state of the vehicle based on the processed information, and comparing, by the controller, the processed information with a preset pre-safe seat belt (PSB) threshold value and operating a PSB for each vehicle driving state based on a result of the comparison.

In an embodiment, in the detecting of the information for determining the driving state of the vehicle, the sensor unit may detect the information for determining the driving state of the vehicle using at least one of a remote impact sensor (RIS), an acceleration sensor, an angular velocity sensor, a speed sensor, a gravity sensor, and a gyro sensor.

In an embodiment, the PSB threshold value may be separately set for each vehicle driving state.

In an embodiment, in the operating of the PSB for each vehicle driving state, the controller may control a binding force and binding time of a safety belt through control of a driving current of a motor for each vehicle driving state by a PSB driving unit.

In an embodiment, the controller may control a posture of an occupant before or after an occurrence of a collision accident by previously detecting the occurrence of the collision accident, may control a posture of the occupant before or after an overturning accident of the vehicle by detecting a situation in which the vehicle overturns, and control a posture of the occupant when the vehicle travels on a rough road, based the control of the binding force and binding time of the safety belt through the PSB driving unit.

In an embodiment, in the operating of the PSB for each vehicle driving state, the controller may control the PSB driving unit based on a preset PSB operation section. The PSB operation section may be set as a wider margin than an airbag deployment-possible section, may be set as a time to collision (TTC) longer than a designated TTC of the airbag deployment-possible section, and may be set as a closing velocity (CV) smaller than a designated CV of the airbag deployment-possible section.

In an embodiment, in order to control the PSB driving unit based on the preset PSB operation section, the controller may set the PSB operation section ahead of the airbag deployment-possible section, and may early bind an occupant through a PSB operation based on a pre-designated PSB operation profile before an airbag is deployed.

In an embodiment, the PSB operation profile may be set to control the binding force of the safety belt by increasing or decreasing the binding force of the safety belt based on the amount of a current for driving a motor for each vehicle driving state and by controlling the amount of the current for driving the motor over time.

In an embodiment, in the operating of the PSB for each vehicle driving state, the controller may check whether the driving state of the vehicle enters the preset PSB operation section for each driving state of the vehicle by comparing the processed information with the PSB threshold value preset for each driving state of the vehicle, and may perform the PSB operation preset for each vehicle driving state through the PSB driving unit when the driving state of the vehicle enters the preset PSB operation section for each driving state of the vehicle, based on a result of the check.

DETAILED DESCRIPTION OF THE ILLUSTRATED EMBODIMENTS

Hereinafter, an integrated control apparatus and method for active and passive safety apparatuses will be described below with reference to the accompanying drawings through various exemplary embodiments.

The thickness of lines or the size of elements shown in the drawings in a process of describing this specification may have been exaggerated for the clarity of a description and for convenience' sake. Furthermore, terms to be described below have been defined by taking into consideration their functions in the present disclosure, and may be different depending on a user or operator's intention or practice. Accordingly, such terms should be interpreted based on the overall contents of this specification.

Figure 1:
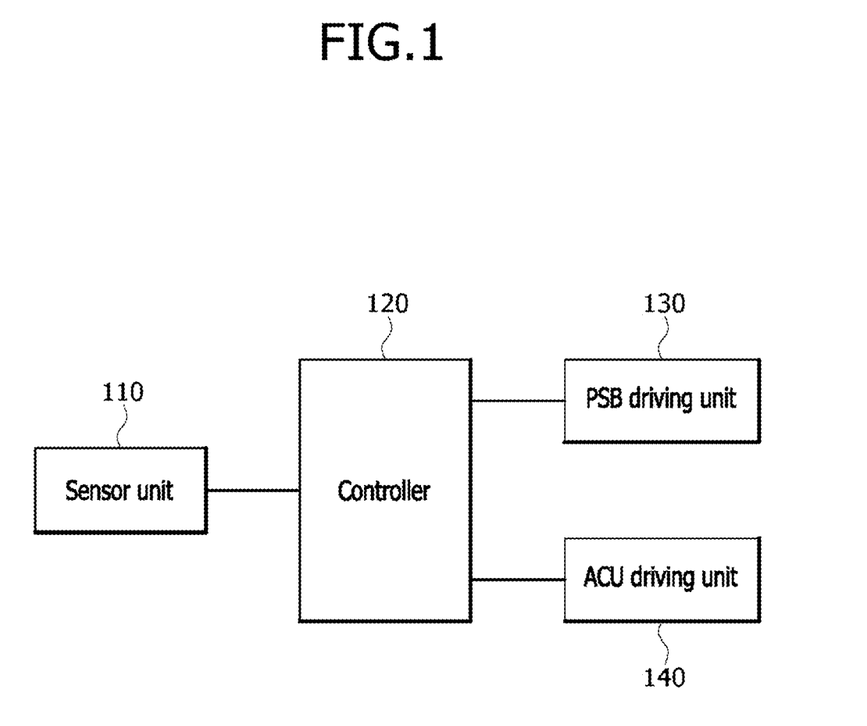
FIG. 1 is an exemplary diagram illustrating a schematic configuration of an integrated control apparatus for active and passive safety apparatuses according to an embodiment of the present disclosure.

FIG. 1 is an exemplary diagram illustrating a schematic configuration of an integrated control apparatus for active and passive safety apparatuses according to an embodiment of the present disclosure.

As illustrated in FIG. 1, the integrated control apparatus for active and passive safety apparatuses according to the present embodiment includes a sensor unit 110, a controller 120, a pre-safe seat belt (PSB) driving unit 130, and an airbag control unit (ACU) driving unit 140.

The sensor unit 110 includes a plurality of sensors for detecting a driving state of a vehicle (or ego-vehicle).

For example, the sensor unit 110 includes a remote impact sensor (RIS), an acceleration sensor, an angular velocity sensor, a speed sensor, a gravity sensor, a gyro sensor, etc. In addition, the sensor unit 110 may include sensors (e.g., a camera sensor, an infrared sensor, an ultrasonic sensor, a radar sensor, and a lidar sensor) previously mounted on a vehicle.

The controller 120 processes (e.g., conversion, information combination, filtering or an operation) information detected by the sensor unit 110.

Furthermore, the controller 120 determines a driving state of a vehicle based on the processed information, compares the processed information with a preset pre-safe seat belt (PSB) threshold value, and operates a PSB for each vehicle driving state.

In this case, the PSB threshold value may include a separate PSB threshold value for each vehicle driving state.

The PSB driving unit 130 controls the binding force and binding time of a safety belt through motor control (i.e., control of a driving current of a motor) under the control of the controller 120.

Accordingly, the PSB driving unit 130 controls a posture of an occupant before or after the occurrence of a collision accident by previously detecting the collision accident using front collision avoidance (FCA) logic, controls a posture of the occupant before or after the overturning accident of the vehicle by detecting a situation in which the vehicle overturns, and controls the posture of the occupant when the vehicle travels on a rough road (e.g., an unpaved road or a road with speed bumps).

Figure 2:
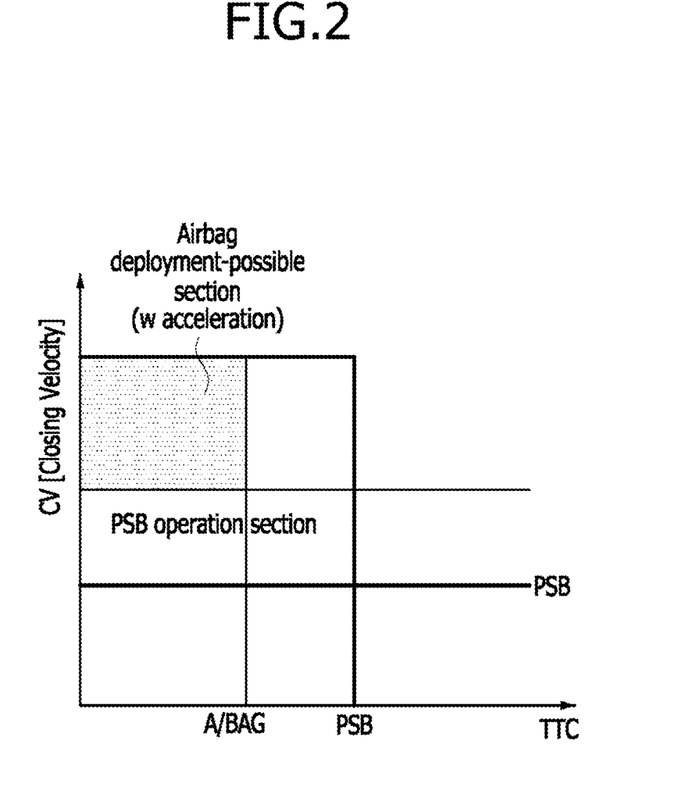
FIG. 2 is an exemplary diagram illustrated to describe a PSB operation section compared to an airbag deployment-possible section, in FIG. 1.

The ACU driving unit 140 deploys an airbag when a collision occurs in the airbag (A/BAG) deployment-possible section (e.g., a section including a designated time to collision (TTC) or less and designated closing velocity (CV) or more), under the control of the controller 120 (refer to FIG. 2).

FIG. 2 is an exemplary diagram illustrated to describe a PSB operation section compared to the A/BAG deployment-possible section, in FIG. 1.

The PSB operation section is set as a wider margin than the airbag deployment-possible section. For example, referring to FIG. 2, the PSB operation section is set as a TTC longer than a designated TTC of the A/BAG deployment-possible section. Furthermore, the PSB operation section is set as a closing velocity (CV) smaller than a designated CV of the A/BAG deployment-possible section.

Accordingly, when a driving state of a vehicle enters the preset PSB operation section for each driving state of the vehicle (e.g., a predicted collision accident state, a rough road driving state, or an overturning progress state), the controller 120 controls the binding force and binding time of a safety belt by performing motor control (i.e., control of the driving current of the motor) through the PSB driving unit 130.

Accordingly, there is an effect in that damage to an occupant that may occur when an airbag is deployed can be reduced by setting the PSB operation section ahead of the A/BAG deployment-possible section, and early binding the occupant through the PSB operation before the airbag is deployed, that is, by reducing a longitudinal behavior of the occupant prior to a collision.

Figure 3:
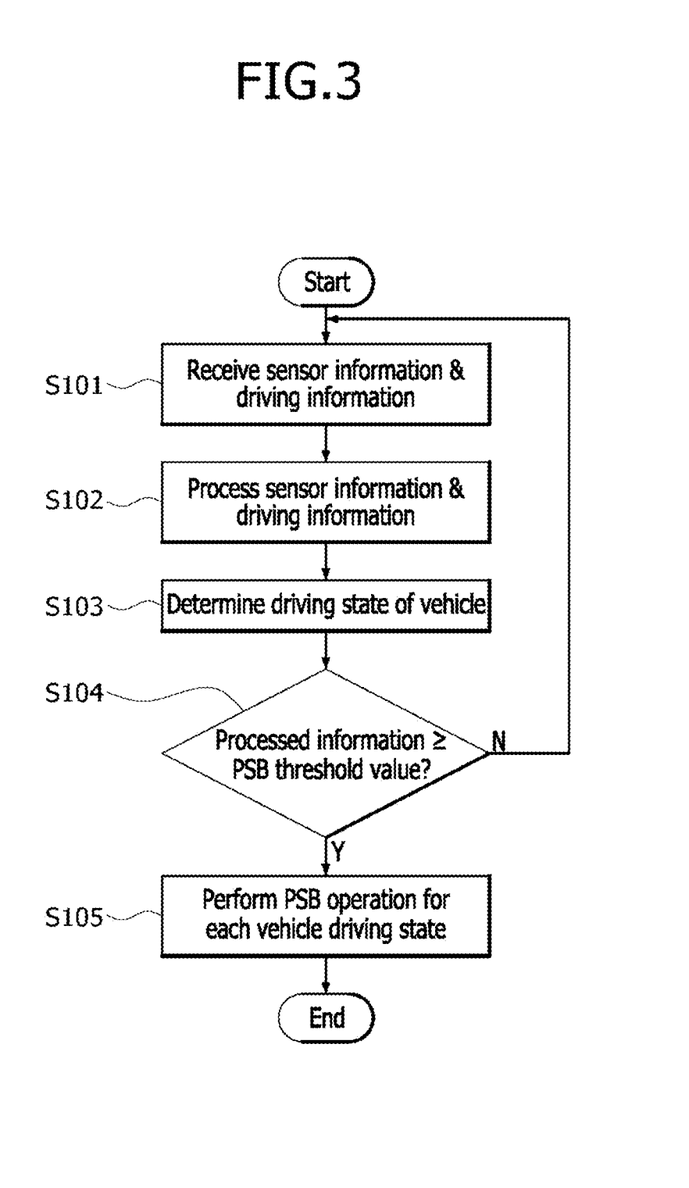
FIG. 3 is a flowchart for describing an integrated control method for active and passive safety apparatuses according to an embodiment of the present disclosure.

FIG. 3 is a flowchart for describing an integrated control method for active and passive safety apparatuses according to an embodiment of the present disclosure.

Referring to FIG. 3, the controller 120 receives information (i.e., sensor information & driving information) for predicting a driving state or risk of an accident of a vehicle through the sensor unit 110 (S101).

For example, the controller 120 receives information detected by a remote impact sensor (RIS), an acceleration sensor, an angular velocity sensor, a speed sensor, a gravity sensor, and a gyro sensor, etc. of the sensor unit 110.

Accordingly, the controller 120 processes the received information (i.e., sensor information & driving information) (S102), and determines a driving state of the vehicle (S103).

For example, the controller 120 may determine a left or right turn state, a driving state, a stop state, an uphill road driving state, a downhill road driving state, a rough road driving state, and the overturning of a vehicle, as a driving state of the vehicle, based on the processed information.

Furthermore, the controller 120 checks whether the processed information (i.e., sensor information & driving information) is equal to or greater than a PSB threshold value preset for each driving state of the vehicle, by comparing the processed information with the PSB threshold value preset for each driving state of the vehicle (S104).

In other words, checking, by the controller 120, whether the processed information (i.e., sensor information & driving information) is equal to or greater than the PSB threshold value preset for each driving state of the vehicle means checking whether a driving state of the vehicle enters the preset PSB operation section for each driving state of the vehicle (e.g., a predicted collision accident state, a rough road driving state, or an overturning progress state).

Figure 4:
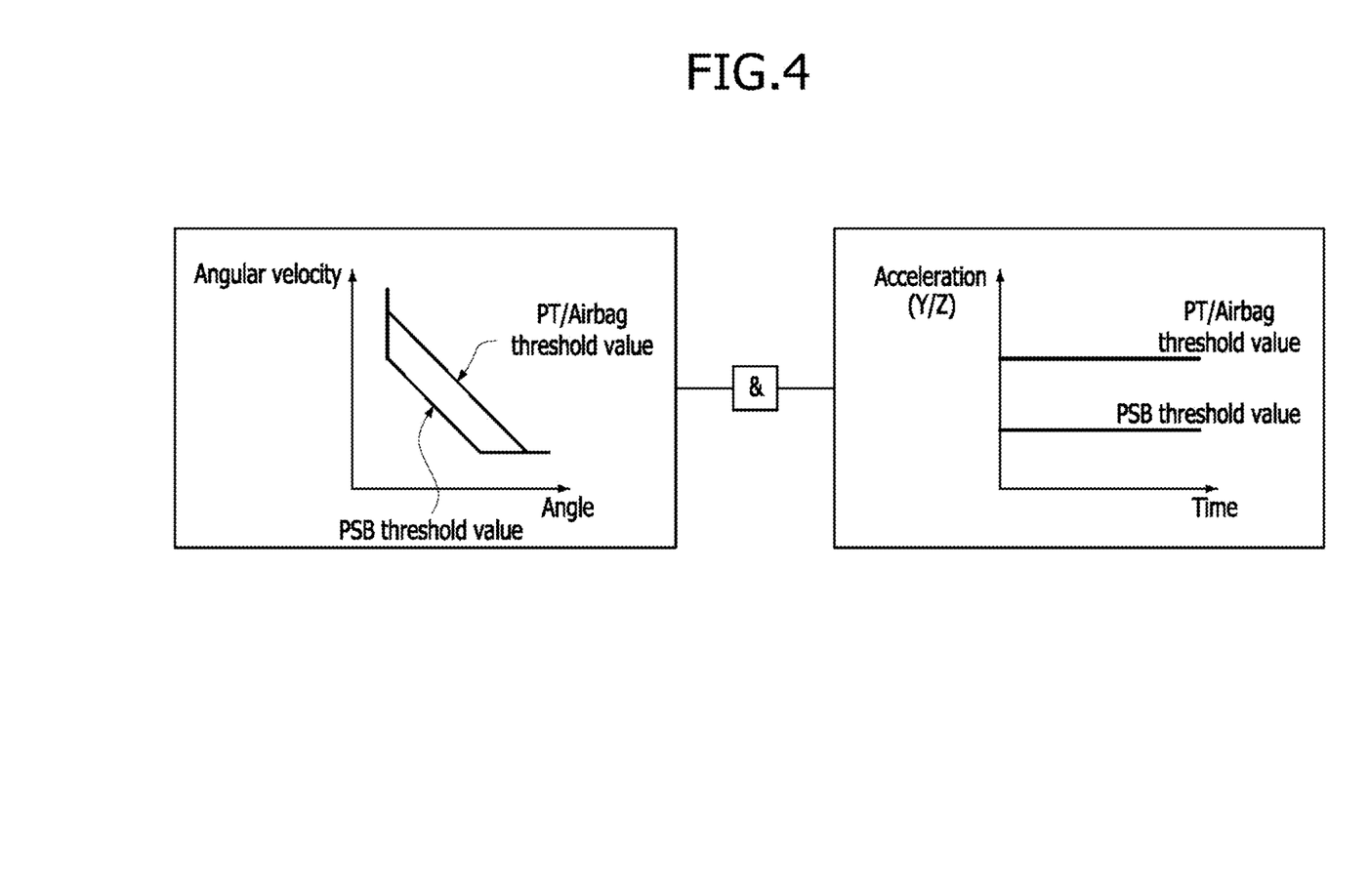
FIG. 4 is an exemplary diagram illustrated to describe a method of performing a PSB operation by determining an overturning state of a vehicle, in FIG. 3.

For example, as illustrated in FIG. 4, the controller 120 may determine whether a vehicle overturns, by combining angular velocity information based on angle information and acceleration (y/z axis) information over time. When the overturning state of the vehicle is determined, the controller 120 limits a behavior of the occupant by binding the occupant at an early stage through the PSB operation at an early stage in which the vehicle starts to overturn (i.e., before the vehicle finally overturns), thereby reducing damage to the occupant.

Figure 5:
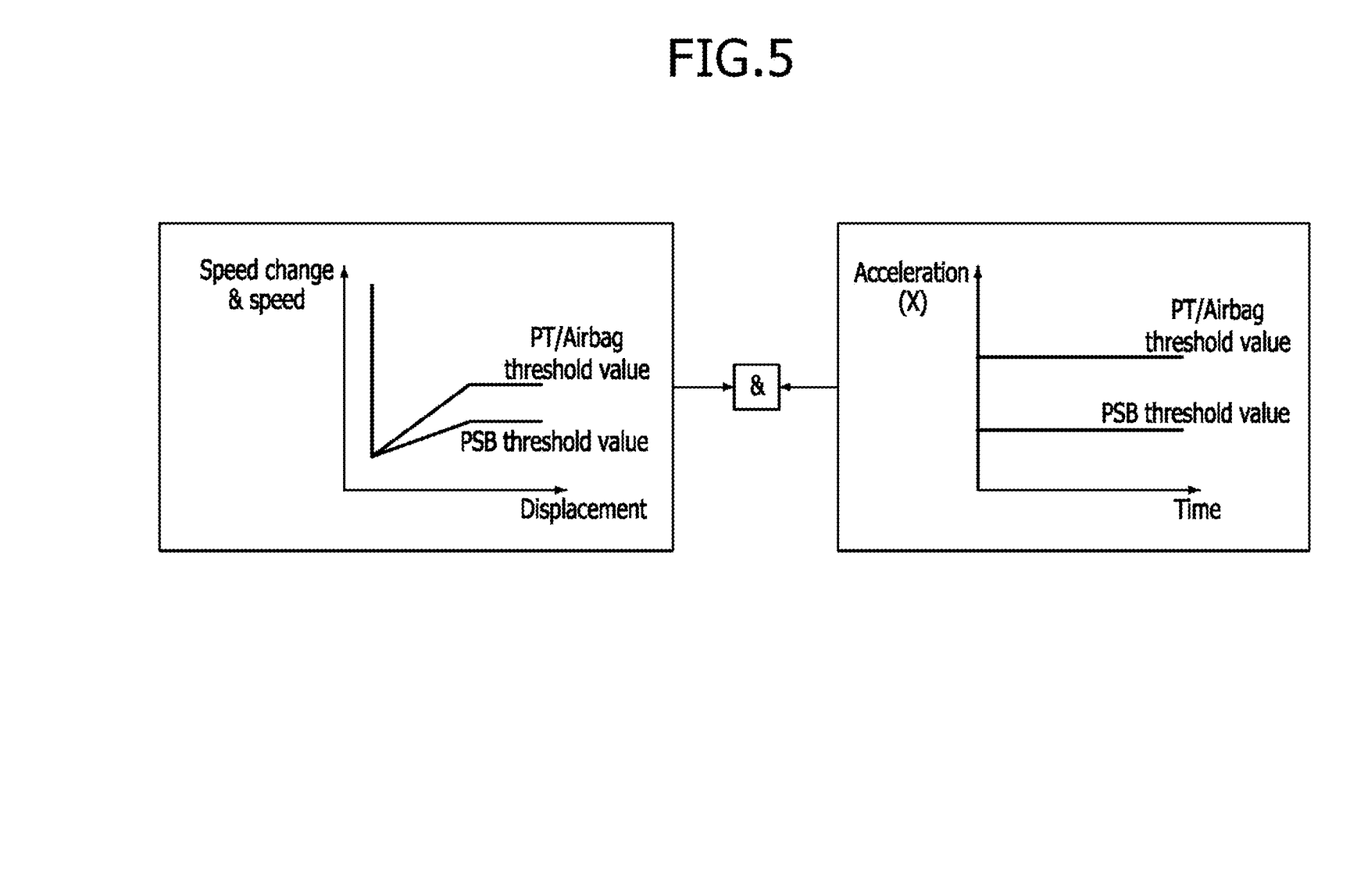
FIG. 5 is an exemplary diagram illustrated to describe a method of performing a PSB operation by determining a state in which a vehicle travels on a rough road, in FIG. 3.

Furthermore, as illustrated in FIG. 5, the controller 120 may determine whether a vehicle travels on a rough road, by combining speed change & speed information based on displacement information and acceleration (x axis) information over time. If it is determined that the vehicle travels on a rough road, the controller 120 restricts a behavior of an occupant by binding the occupant at an early stage through the PSB operation when the vehicle travels on the rough road, thereby preventing the occurrence of a dangerous situation (e.g., an collision of the occupant with the inside of the vehicle, which is attributable to shaking).

In FIGS. 4 and 5, a PT is an abbreviation of a pretensioner.

Accordingly, when the information (i.e., sensor information & driving information) is equal to or greater than the PSB threshold value preset for each driving state of the vehicle (Yes in S104), that is, when the driving state of the vehicle enters the preset PSB operation section for each driving state of the vehicle (e.g., a predicted collision accident state, a rough road driving state, or an overturning progress state), the controller 120 performs the PSB operation preset for each vehicle driving state through the PSB driving unit 130 (S105).

Figure 6:
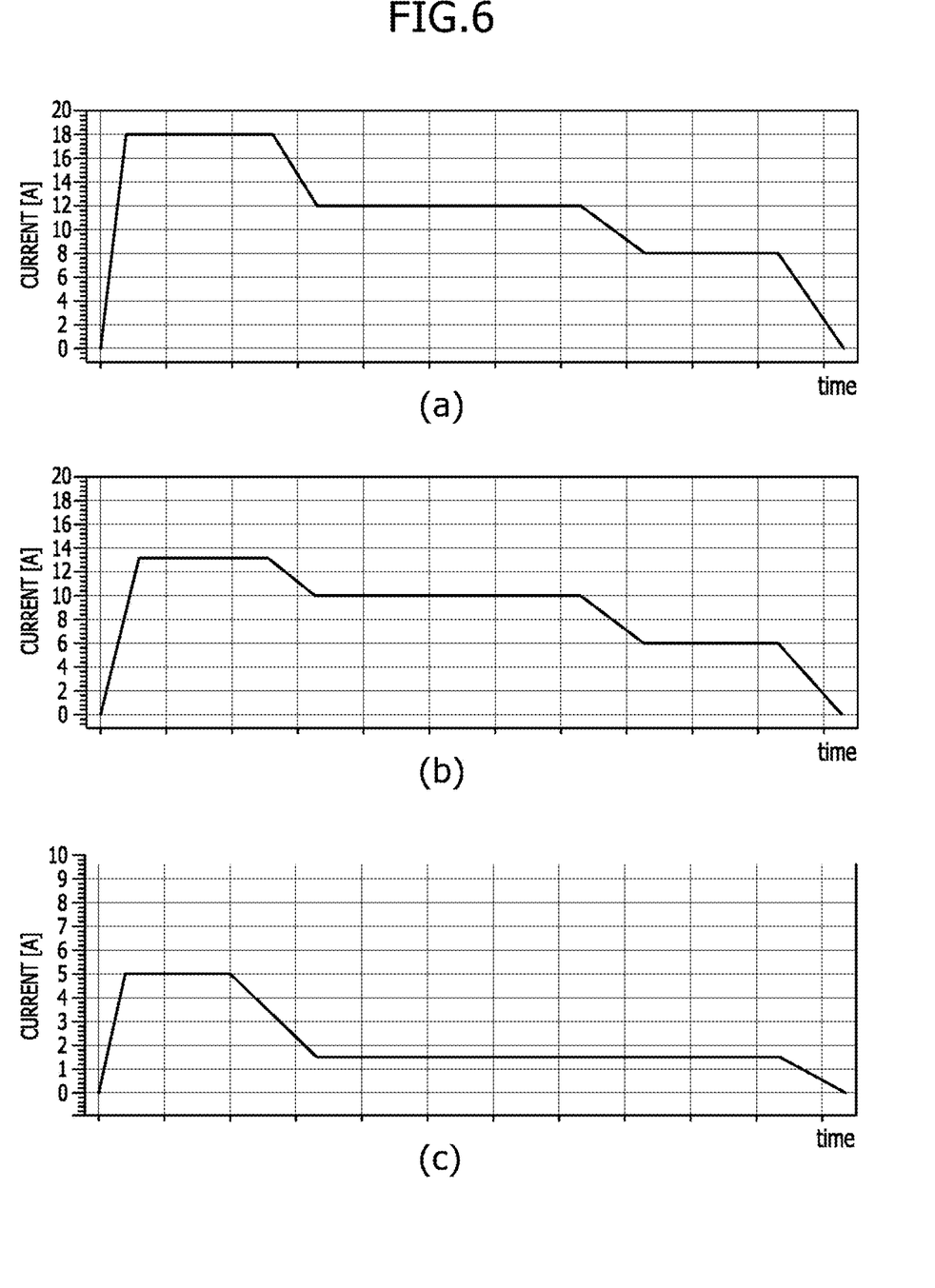
FIG. 6 is an exemplary diagram illustrating PSB operation profiles for controlling the binding force and binding time of a safety belt for each vehicle driving state, in FIG. 3.

For example, as illustrated in (a), (b), and (c) of FIG. 6, the controller 120 controls the binding force and binding time of a safety belt by performing motor control (i.e., control of the driving current of the motor) based on a PSB operation profile preset for each vehicle driving state.

FIG. 6 is an exemplary diagram illustrating PSB operation profiles for controlling the binding force and binding time of a safety belt for each vehicle driving state, in FIG. 3. The binding force of a safety belt may be increased or decreased depending on the amount of a current for driving a motor or may be controlled by adjusting the amount of a current for driving the motor over time.

As described above, the present embodiment has an effect in that it can reduce damage, which may occur in an occupant when an airbag is deployed, by early binding the occupant through the PSB operation before the airbag is deployed, that is, by reducing a longitudinal behavior of the occupant ahead of a collision, in various vehicle driving states.

According to an aspect, the present disclosure can improve safety by minimizing a behavior of an occupant through control of the binding force of a safety belt, before a collision occurs in a vehicle, at an early stage in which the overturning of a vehicle occurs, and in a situation in which a vehicle travels on a rough road.

The present disclosure has been described above based on the embodiments illustrated in the accompanying drawings, but the embodiments are merely illustrative. A person having ordinary skill in the art to which the present disclosure pertains will understand that various modifications and other equivalent embodiments are possible from the embodiments. Accordingly, the technical range of protection of the present disclosure should be determined by the following claims. Furthermore, an implementation described in this specification may be realized as a method or process, apparatus, software program, data stream or signal, for example. Although the present disclosure has been discussed only in the context of a single form of an implementation (e.g., discussed as only a method), the discussed characteristic may also be implemented in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a mobile phone/personal digital assistant ("PDA") and another device which facilitates the communication of information between end-users.

What is claimed is:

1. An integrated control apparatus for active and passive safety apparatuses, comprising:
    a sensor unit comprising a plurality of sensors for detecting a driving state of a vehicle;
    a controller configured to process information detected through the sensor unit, determine a driving state of the vehicle based on the processed information, compare the processed information with a preset pre-safe seat belt (PSB) threshold value, and operate a PSB for each vehicle driving state based on a result of the comparison; and
    a PSB driving unit configured to control a binding force and binding time of a safety belt through control of a driving current of a motor under control of the controller, wherein the controller, based the control of the binding force and binding time of the safety belt through the PSB driving unit, controls:
        a posture of an occupant before or after an occurrence of a collision accident by previously detecting the occurrence of the collision accident,
        a posture of the occupant before or after an overturning accident of the vehicle by detecting a situation in which the vehicle overturns, and
        a posture of the occupant when the vehicle travels on a rough road.

2. The integrated control apparatus of claim 1, wherein the sensor unit comprises at least one of a radar sensor, a lidar sensor, a camera sensor, a remote impact sensor (RIS), an acceleration sensor, an angular velocity sensor, a speed sensor, a gravity sensor, and a gyro sensor.

3. The integrated control apparatus of claim 1, wherein the PSB threshold value is able to be separately set for each vehicle driving state.

4. The integrated control apparatus of claim 1, wherein:
    the controller controls the PSB driving unit based on a preset PSB operation section, and
    the PSB operation section is set as a wider margin than an airbag deployment-possible section, and
    the PSB operation section is set as a time to collision (TTC) longer than a designated TTC of the airbag deployment-possible section and is set as a closing velocity (CV) smaller than a designated CV of the airbag deployment-possible section.

5. The integrated control apparatus of claim 4, wherein the controller
    sets the PSB operation section ahead of the airbag deployment-possible section, and
    early binds an occupant through a PSB operation based on a pre-designated PSB operation profile before an airbag is deployed.

6. The integrated control apparatus of claim 5, wherein the PSB operation profile is set to control the binding force of the safety belt by increasing or decreasing the binding force of the safety belt based on an amount of a current for driving a motor for each vehicle driving state and by controlling the amount of the current for driving the motor over time.

7. The integrated control apparatus of claim 1, wherein the controller
    receives information for predicting the driving state or risk of an accident of the vehicle through the sensor unit,
    determines the driving state of the vehicle by machining or processing the received information,
    checks whether the driving state of the vehicle enters the preset PSB operation section for each driving state of the vehicle by comparing the processed information with the PSB threshold value preset for each driving state of the vehicle, and
    performs the PSB operation preset for each vehicle driving state through the PSB driving unit when the driving state of the vehicle enters the preset PSB operation section for each driving state of the vehicle, based on a result of the check.

8. An integrated control method for active and passive safety apparatuses, comprising:
    detecting, by a sensor unit, information for determining a driving state of a vehicle;
    machining or processing, by a controller, the information detected by the sensor unit;
    determining, by the controller, a driving state of the vehicle based on the processed information, and
    comparing, by the controller, the processed information with a preset pre-safe seat belt (PSB) threshold value and operating a PSB for each vehicle driving state based on a result of the comparison, wherein in the operating of the PSB for each vehicle driving state, the controller controls a binding force and binding time of a safety belt through control of a driving current of a motor for each vehicle driving state by a PSB driving unit;
    wherein the controller, based the control of the binding force and binding time of the safety belt through the PSB driving unit, controls:
        a posture of an occupant before or after an occurrence of a collision accident by previously detecting the occurrence of the collision accident,
        a posture of the occupant before or after an overturning accident of the vehicle by detecting a situation in which the vehicle overturns, and
        a posture of the occupant when the vehicle travels on a rough road.

9. The integrated control method of claim 8, wherein in the detecting of the information for determining the driving state of the vehicle,
    the sensor unit detects the information for determining the driving state of the vehicle using at least one of a remote impact sensor (RIS), an acceleration sensor, an angular velocity sensor, a speed sensor, a gravity sensor, and a gyro sensor.

10. The integrated control method of claim 8, wherein the PSB threshold value is able to be separately set for each vehicle driving state.

11. The integrated control method of claim 8, wherein in the operating of the PSB for each vehicle driving state,
    the controller controls the PSB driving unit based on a preset PSB operation section, and the PSB operation section is set as a wider margin than an airbag deployment-possible section, and the PSB operation section is set as a time to collision (TTC) longer than a designated TTC of the airbag deployment-possible section and is set as a closing velocity (CV) smaller than a designated CV of the airbag deployment-possible section.

12. The integrated control method of claim 11, wherein in order to control the PSB driving unit based on the preset PSB operation section, the controller sets the PSB operation section ahead of the airbag deployment-possible section, and early binds an occupant through a PSB operation based on a pre-designated PSB operation profile before an airbag is deployed.

13. The integrated control method of claim 12, wherein the PSB operation profile is set to control the binding force of the safety belt by increasing or decreasing the binding force of the safety belt based on an amount of a current for driving a motor for each vehicle driving state and by controlling the amount of the current for driving the motor over time.

14. The integrated control method of claim 8, wherein in the operating of the PSB for each vehicle driving state, the controller checks whether the driving state of the vehicle enters the preset PSB operation section for each driving state of the vehicle by comparing the processed information with the PSB threshold value preset for each driving state of the vehicle, and performs the PSB operation preset for each vehicle driving state through the PSB driving unit when the driving state of the vehicle enters the preset PSB operation section for each driving state of the vehicle, based on a result of the check.

15. An integrated control apparatus for active and passive safety apparatuses, comprising:

a sensor unit comprising a plurality of sensors for detecting a driving state of a vehicle;

a controller configured to process information detected through the sensor unit, determine a driving state of the vehicle based on the processed information, compare the processed information with a preset pre-safe seat belt (PSB) threshold value, and operate a PSB for each vehicle driving state based on a result of the comparison, wherein:

the controller controls the PSB driving unit based on a preset PSB operation section, and the PSB operation section is set as a wider margin than an airbag deployment-possible section, and the PSB operation section is set as a time to collision (TTC) longer than a designated TTC of the airbag deployment-possible section and is set as a closing velocity (CV) smaller than a designated CV of the airbag deployment-possible section.

* * * * *